United States Patent [19]
Depouilly et al.

[11] 3,965,303
[45] June 22, 1976

[54] SCANNING AND DISTRIBUTING SYSTEM FOR LARGE CENTRALLY CONTROLLED SWITCHING EXCHANGES

[75] Inventors: Bernard Michel Henri Depouilly; Christian Yves Tournier, both of Paris, France

[73] Assignee: International Standard Electric Corporation, New York, N.Y.

[22] Filed: Aug. 26, 1974

[21] Appl. No.: 500,426

Related U.S. Application Data

[63] Continuation of Ser. No. 304,644, Nov. 8, 1972, abandoned.

[30] Foreign Application Priority Data

Nov. 9, 1971   France .............................. 71.40070

[52] U.S. Cl. ......................... 179/18 FG; 179/18 ES
[51] Int. Cl.² ......................................... H04Q 3/54
[58] Field of Search ......... 179/18 ES, 18 FG, 18 FF

[56] References Cited

UNITED STATES PATENTS

| | | | |
|---|---|---|---|
| 3,493,683 | 2/1970 | Schlicte et al. ............ | 179/18 FG X |
| 3,560,655 | 2/1971 | Lucas et al. .................... | 179/18 FF |

*Primary Examiner*—Thomas W. Brown
*Attorney, Agent, or Firm*—J. B. Raden; D. P. Warner

[57] ABSTRACT

A scanner-distributor for large electronic space-division exchanges is provided to operate from a logic address to scan a plurality of points in a number of junctors. A converter translates the logic address into a 1-out-of-x code and is followed by a distribution frame which translates the 1-out-of-x code address into a physical address. Thus, growth is possible in the exchange without disturbing the sequence of logic addresses, since new junctors may be coupled in the distribution frame without requiring that changes be made in either the prior existing logic addresses or the prior wiring in the distribution frame.

6 Claims, 2 Drawing Figures

SCANNING AND DISTRIBUTING SYSTEM FOR LARGE CENTRALLY CONTROLLED SWITCHING EXCHANGES

This is a continuation of application ser. No. 304,644 filed Nov. 8, 1972 now abandoned.

BACKGROUND OF THE INVENTION

1. Field of the Invention

The present invention relates to scanning and distributing systems for centrally controlled telephone exchanges. Embodiments of the invention are capable of collecting data from various units in an exchange and dispatching orders as needed for operating those units.

2. Description of the Prior Art

A telephone exchange comprises a number of units such as trunk or junctor circuits, dialling receivers, and senders, which intervene episodically in setting up communications so as to provide for signaling, transmission, and reception as they are required.

Roughly, in a telephone exchange control unit computers have a time chart comprising: 1. A first part assigned to scanning - for being informed of conditions of those units and detecting any distinctive event; 2. a second part assigned to distributing orders to the concerned units; and 3. a third part assigned to others tasks and, in particular, to processing data collected during scanning operations so as to derive therefrom orders to be distributed.

In a conventional system, the control unit is helped in scanning and distributing by auxiliary systems which permit optimal use of the control unit time chart by taking over part of the simple operations.

In particular, there is known a system making it possible to scan the units per groups of the same type, one point in each unit of a group being simultaneously scanned simultaneously with similar points of other units of the same group so that a single address provides activation of those points and that scanning result for those points is sent to the control unit in the form of one word, each bit of which corresponds to a unit.

It is also known to sequentially scan similar point of the unit groups of a same type, the scanning system deriving the sequential addresses of the units groups in a same type from the first address delivered by the control unit as well as the number of sequential addresses and the operation code determining the points to be scanned according to their function.

However, such systems have certain drawbacks due to the fact that the groups of units of the same type have sequential addresses which require a carefully structured lay-out of the units within the exchange. But, for a large telephone exchange, full capacity is not provided initially, the exchange being generally formed of only a part of its ultimate equipment at installation time. While it is possible to plan future traffic, it is not possible to accurately plan what equipments will later to be installed, equipment needs when growth occurs being possibly very different from those planned. As a result, it is not easy to provide a complete layout which will fill the needs for an operational scanning system very far in the future.

Thus, a purpose of the present invention is to provide for a scanning and distributing system, such as is referred to above, which is sufficiently flexible to adapt to future growth and changes, with respect to unit layout and programming.

SUMMARY OF THE INVENTION

According to a feature of this invention, there is provided a scanning and distributing system. The system is capable, on the one hand, of providing-for scanning or distributing purpose - for simultaneous activation of a plurality of points from a single logic address, specific to that plurality of points and delivered from the exchange control unit. On the other hand, the system provides for sequential activation of pluralities of points activated from their sequential logic addresses obtained from the first of them through repetitive operation. The system employs a distribution frame converting the logic addresses into physical addresses corresponding to the locations of the pluralities of points within the exchange.

BRIEF DESCRIPTION OF THE DRAWINGS

Other features of the present invention will appear more clearly from the following description of an embodiment, the said description being made in conjunction with the accompanying drawings, among which.

DETAILED DESCRIPTION OF PREFERRED EMBODIMENTS

Figure 1:
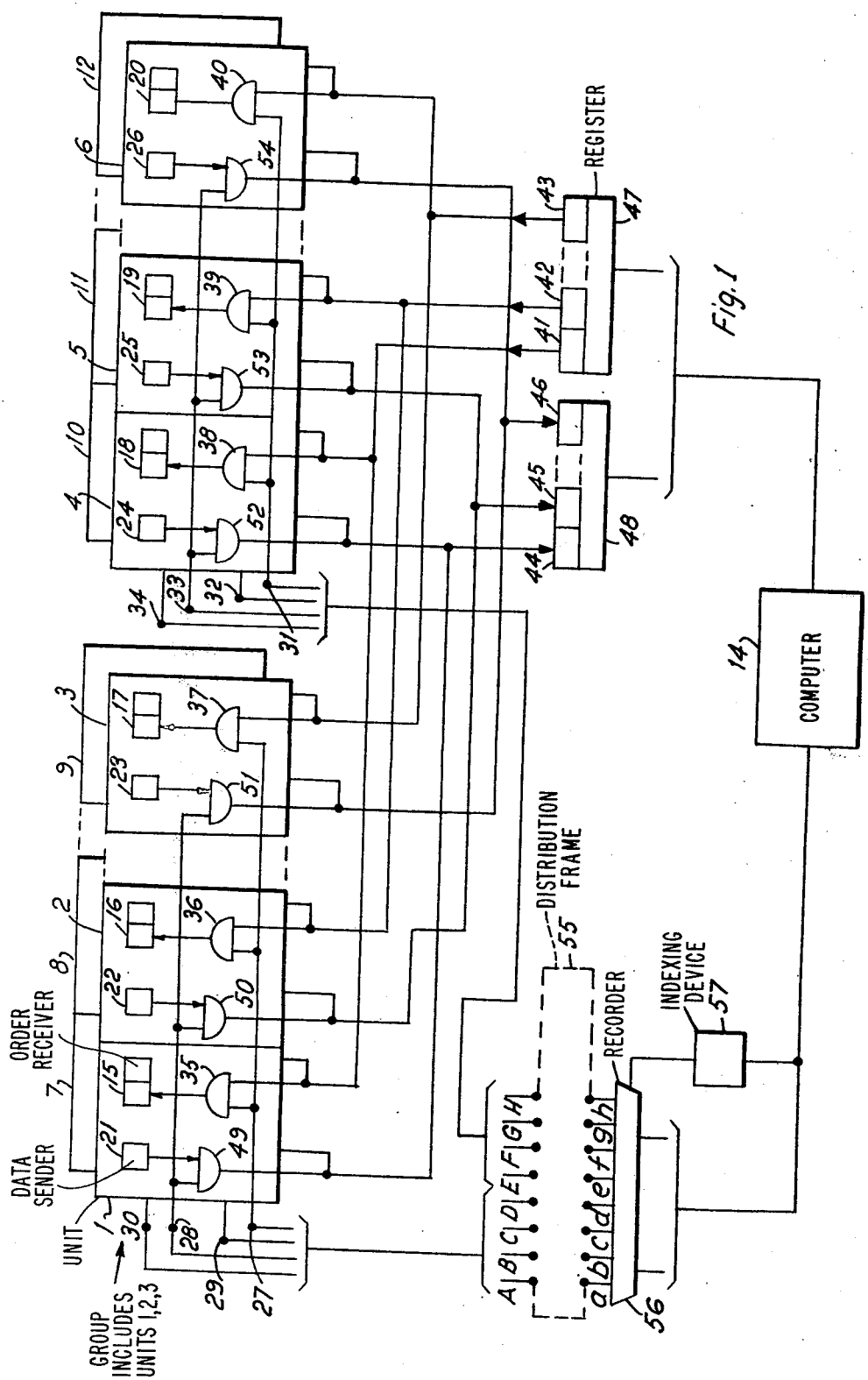
FIG. 1 is a schematic diagram of the scanning-distributing system according to this invention.

FIG. 1 shows a number of units such as 1–12, capable of providing a computer at 14 with data and of receiving orders from computer 14. Each unit has, for that purpose, an order receiver represented by a flip-flop, such as 15 for unit 1, and a data sender, represented by a block 21 for unit 1.

According to a known method, the units are grouped to form groups such as the one which includes units 1, 2 and 3 or the other one which includes units 4, 5 and 6, etc.

Each group is connected to the computer to make it possible for the computer to provide by means of a single address signal for the simultaneous control of a receiver in each of the units of the groups, or the simultaneous scanning of a sender in each of the units. For example, the activation by computer 14 of the common point 27 feeds one input of each of the AND gates 35, 36 and 37 of the group of units 1, 2 and 3 and controls flip-flops 15, 16 and 17 according to data contained in boxes 41, 42 and 43 of register 47.

Assuming that points 27, 29, 31 and 32 correspond to common points associated with identical functions, it is of interest that they be given sequential addresses which enable the computer-provided that an indexing device 57 is added to the decoder 56 - to achieve sequential addressing of those three common points by means of information containing the address of the first of them and their number, i.e. in the present embodiment, 4. This is of particular interest when scanning cycles may be very different for different functions, since it is thus possible to have a suitable duration for each cycle, which is not possible in a scanning per unit.

Assume that the groups, including units 1, 2, 3 and 7, 8, 9, are of the same type and that that type is different from the type of units 4, 5, 6. Therefore, common points 27 and 31 are sequentially activated and, as a result, are connected to the successive terminals *a* and *b* of the decoder so that their sequential activation is performed by a single information from computer 14.

In the case of exchange growth, it may be necessary to add a group of units such as 10, 11, 12, either to group 1, 2, 3, 7, 8, 9, or to group 4, 5, 6, that is to use terminal c, either with group a, b in the first case, or with d in the second one. That is particularly cumbersome regarding wiring and equipment, when there are numerous units and if a distribution frame such as 55 is not utilized, which makes needed changes possible and a layout pattern independent of the logic pattern used in the computer, such a distribution frame providing, in addition, computer busy time reduction when it controls the scanning-distributing system.

Figure 2:
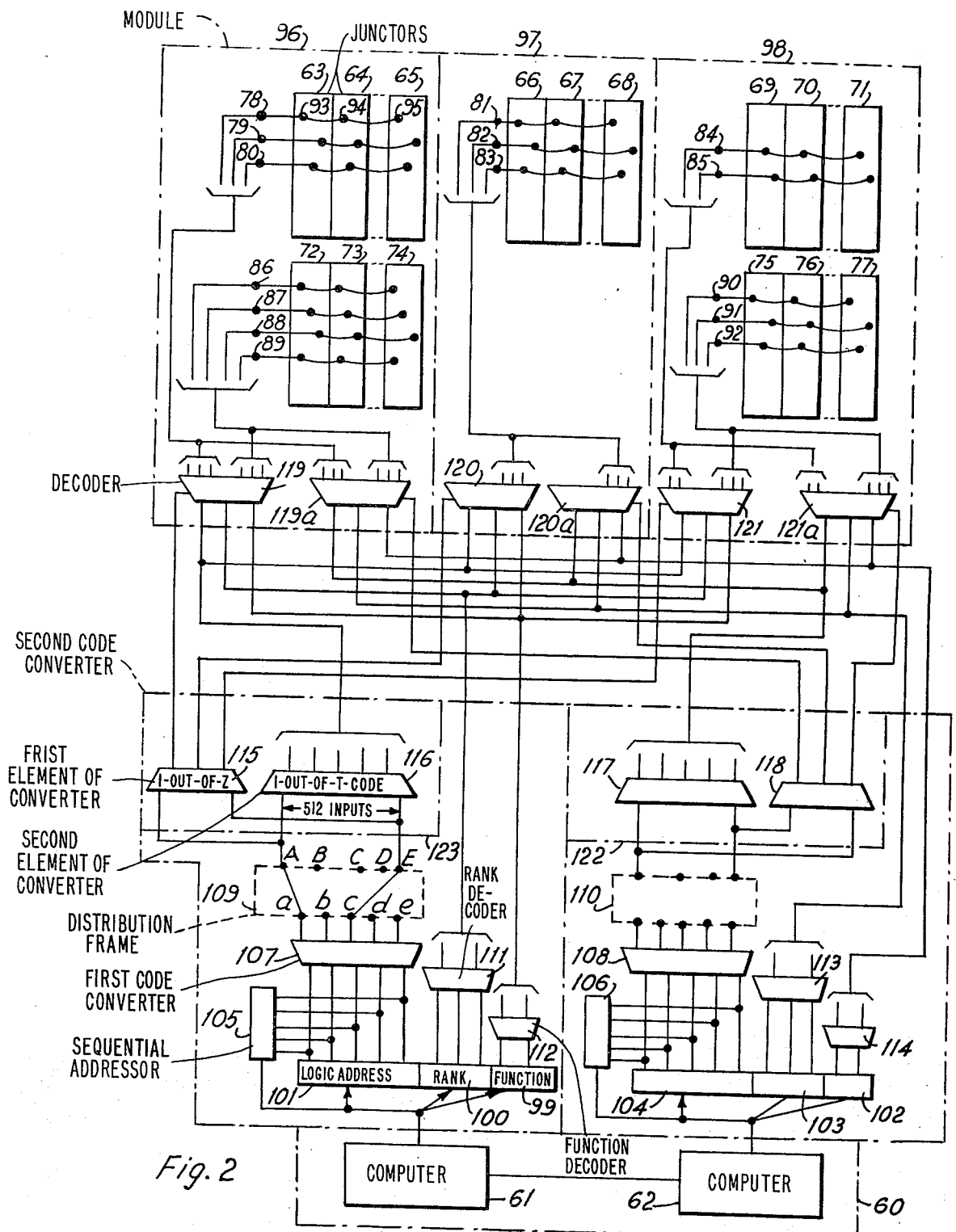
FIG. 2 is an overall diagram of a central control telephone exchange equipped according to this invention.

In the embodiment used with a large capacity telephone exchange, as shown in FIG. 2, the scanning-distributing system according to this invention is used for transferring information between the 16 000 trunk and junctor circuits of the exchange and the two computers 61 and 62 of the control unit 60.

In a conventional manner, both computers are able individually to achieve all the scanning and the distributing operations, only one being at a time used for those tasks.

Trunk and junctor circuits belong to distinct groups and are grouped preferably into groups whose units have the same number of scanning points and the same number of distributing points.

In the embodiment of FIG. 2, a group of trunk or junctor circuits may comprise a number of units equal to the corresponding number of the scanning and distributing register boxes or cells; such a number is hereby selected equal to the longest word used in the memories of the computers, i.e. here 32, since 32-bit words are used in those computers.

Each group of junctors such as that which comprises junctors 63, 64, 65 has an individual logic address; common points for scanning and distributing in this group, such as common points 78, 79, 80, are connected to inputs of devices that they simultaneously activate, such as inputs 93, 94, 95 for 78.

Each common point corresponding to a specific function, such as 78, has an address made of an operation code determining its general function, for example, either scanning or distributing, and its rank among the common points having the same function in the considered group of junctors. In this embodiment, the operation code may include auxiliary general functions such as supervision and maintenance, each general function, such as distribution, being able to reach (depending on the rank information) one among the eight points capable of being subject to distribution in a junctor.

For those reasons which will be hereafter described, the junctors (and trunks) are located in modules, such as 96, 97, 98, each module including a maximum number of junctors which in a preferred embodiment is a total of 512 junctor groups.

For a scanning operation, for example, the concerned computer, for example 61, delivers an information including the address of the first point to be activated, for example 78, and the number of common points identical to the said first point which will be to activate during the following sequence. In the shown embodiment, the junctor groups, one comprising junctors 63, 64, 65, a second one comprising junctors 66, 67, 68, a last one comprising junctors 75, 76, 77, are assumed to be identical with the result that, for example, the three common points 78, 81, 90 are to be activated.

Computer 61 will provide register cells 99, 100, 101 with a binary information concerning the function in 99, a binary information concerning the rank in 100, the logic address of the first common point in 101, while a binary information concerning the number of common points to have sequentially activated is delivered from 61 to device 105 designed for sequentially addressing those common points by deriving their logic addresses in the course of the simple repetitive operation.

Register cell 101 has its outputs coupled to inputs of a first code converter 107 which activates that of its outputs which corresponds to the common point logic address it has received.

Code converter 107 has as many outputs as there are junctor groups in the exchange, i.e. 512 in the described example.

During successive addressing of a sequence of identical common points, such as 78, 81, 90, the corresponding successive outputs of code converter 107 are in turn activated, i.e. a, b, c in the described example.

Distribution frame 109 achieves the correspondency of the logic address with physical point address in the exchange structure, provided that the physical address is common to all the common points of a junctor group.

Thus, in the described example relating to common points 78, 81, and 90, terminal a is coupled to A which corresponds to the first junctor group (63, 64, etc.) and c to E which corresponds to the last junctor group (75, 76, etc.)

Decoders 111 and 112 perform rank decoding and function decoding, respectively.

As a result of the high number of outputs of the first converter 107 and, as a consequence, of frame 109, it is of interest to reduce the number of wires from distribution frame 109 to modules such as 96, 97, 98.

A second converter 123 having $x = 512$ inputs in the described example, performs a double coding, providing for each marked input, by means of a first element 115, a 1-out-of-$z$ coding - $z$ being the number of modules in the exchange — and, by means of a second element 116, providing a 1-out-of-$t$ coding $t$ being the number of junctor groups in a module —.

In view of the size of an exchange having a capacity as hereabove defined, and due to use of pulse techniques and very highspeed circuits, a transmission equipment capable of transmitting D.C. signal is provided between the modules 96, 97, 98 and the elements 115 and 116 of the converter 123, which still further justifies the use of converter 123 for reducing the number of wires. Each module constitutes a distinct item as far as transmission equipment is concerned and includes a decoder coupled to that transmission equipment, not shown, such as decoders 119, 120, 121 for modules 96, 97, 98.

Each decoder, such as 119, has its inputs connected — in parallel with other module decoders —, on the one hand, individually to an output specific to element 115 so as to provide its activation and, on the other hand, to outputs of element 116 and of decoders 111 and 112.

Each module decoder has its outputs connected respectively to one of the module common points, such as 78, 79, 80, 86, 87, 88, 89, etc., each output corresponding to a specific combination of the specific address of a group, of a function — for example, scanning —, and of a concerned rank with respect to points assigned to the same function in the group.

Each computer is equipped with a scanner-distributor identically designed as the above described one and coupled in parallel to common points so as to be able to separately operate various junctors.

The various converters, decoders, registers are made according to conventional integrated techniques and it has not been considered as necessary to describe with details the control means for scanning and distributing points through the common points, and to describe the structure of those points, such control means and structure being known to those skilled in the art.

While the principles of the present invention have hereabove been described with reference to specific embodiments, it will be clearly understood that the said description has only beem made by way of example and does not limit the scope of this invention.

What is claimed is:

1. A scanning and distributing system for a centrally controlled telephone exchange to enable simultaneous supply of activation signals to a plurality of input points of devices in a number of switching units in an exchange from a single address specific to that plurality of points; comprising means coupled to receive signals from a computer and to route such signals to an exchange; said means including a plurality of code converters, a distribution frame and module decoders; a first one of said code converters being adaptable to receive signals representing logic addresses and to activate input terminals of said distribution frame in accordance with the logic addresses, said distribution frame responding to said signals representing logic addresses to provide output signals representing physical addresses corresponding to the locations of the pluralities of points within the exchange; and a second one of said code converters coupled to receive the output signals from said distribution frame and transmit them to respective module decoders; said module decoders routing signals to activate the plurality of input points in the switching units of the exchange.

2. A scanning and distributing system, according to claim 1, in which the first code converter is coupled between a computer and the distributing frame; the first code converter converts binary code into 1-out-of-$x$ code, thereby preparing the plurality of logic addresses for application to the distributing frame for conversion into addresses of a plurality of physical point locations; and the module decoders convert part of the addresses to an operation code including a plurality of points to be coupled in common.

3. A scanning and distributing system according to claim 2, in which pluralities of points are distributed among switching units forming a group and all the points in a group have the same physical address and individually correspond each to a particular type of point.

4. A scanning and distributing system according to claim 3, in which switching units are grouped in modules, each module including a decoder having its inputs coupled to the distribution frame outputs and to the second code converter outputs to activate the plurality of points corresponding to the marked distribution frame and second converter outputs.

5. A scanning and distributing system according to claim 2, in which the second code converter converts the logic address from 1-out-of-$tz$ into a 1-out-of-$t$ code and a 1-out-of-$z$ code, and the second converter is inserted between the distribution frame and $z$ module decoders so as to reduce the number of wires to the modules; each module having a maximum of $t$ groups.

6. A scanning and distributing system according to claim 1, for an exchange controlled by duplicated computers, in which for each computer there is included a first code converter, a distribution frame, a second code converter, a module decoder and means coupling outputs of said second code converter and said module decoders to switching units in parallel.

* * * * *